July 29, 1958 G. J. R. PIEL 2,845,219
REPRESENTATION TRANSLATION OF ELECTRIC MAGNITUDE
Filed May 31, 1951 4 Sheets-Sheet 1

INVENTOR
GERARD JEAN RENE PIEL
By Baldwin & Wight ATTORNEYS

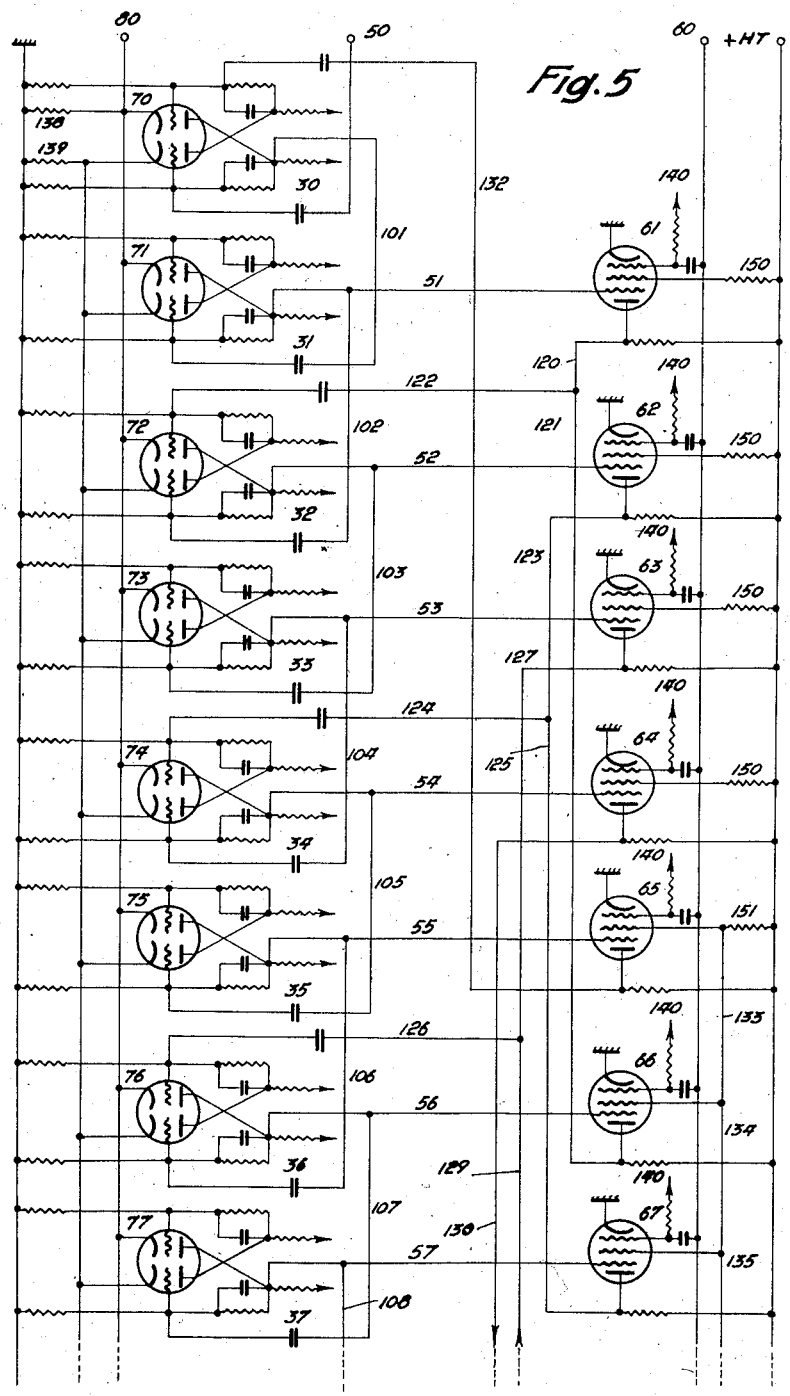

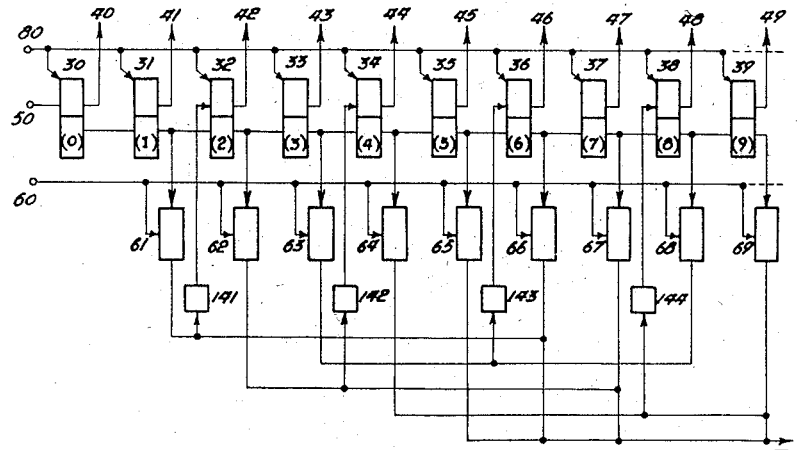
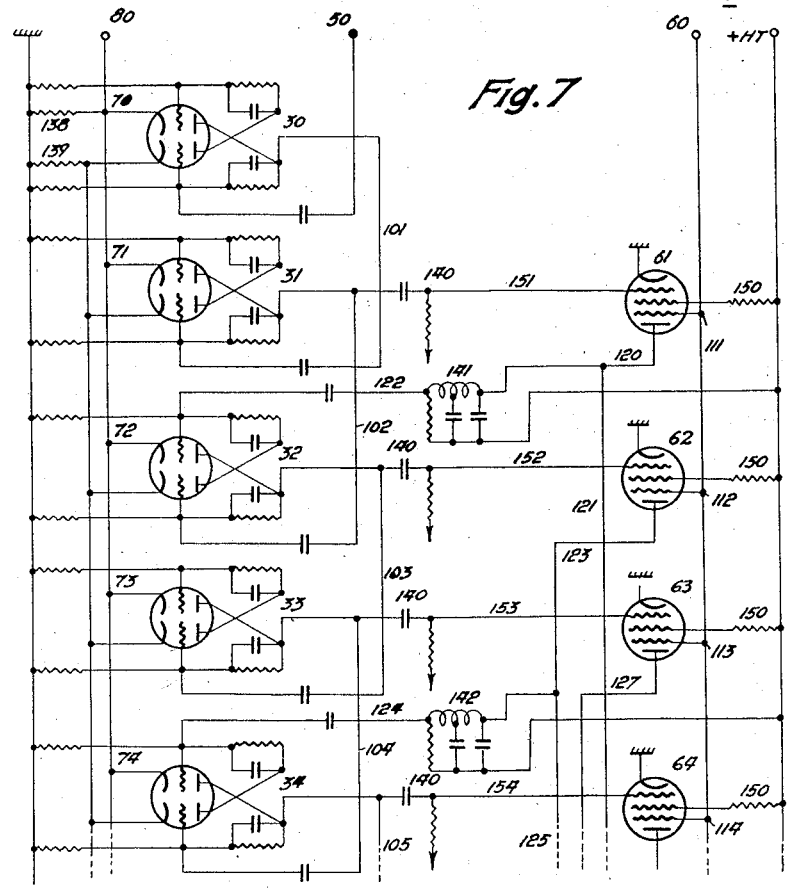

2,845,219
Patented July 29, 1958

2,845,219

REPRESENTATION TRANSLATION OF ELECTRIC MAGNITUDE

Gérard Jean René Piel, Paris, France, assignor to Societe d'Electronique et d'Automatisme, Paris, France, a corporation of France Application May 31, 1951, Serial No. 229,033

Claims priority, application France June 7, 1950

5 Claims. (Cl. 235—61)

This invention relates to methods of, and means for, electrically performing the mathematical operation of converting a numerical quantity expressed in the binary scale of notation to its corresponding expression in the denary scale of notation, and more particularly to the conversion of the electrical code or representation of the quantity in the binary scale to the corresponding electrical representation of the quantity in the denary scale. The means for performing such conversions will herein be called a scale converter.

The binary-scale code referred to herein is that in which voltages, by their distribution in space (potential gradients of different conductors) or in time (trains of impulses) respectively represent or reproduce in electrical form the coefficients or digits $a$ of the individual terms of the expansion of a numerical quantity A into the series $$a_0 + 2a_1 + 2^2 a_2 + 2^3 a_3 + \ldots + 2^{n-2} a_{n-2} + 2^{n-1} a_{n-1}$$

where such expansion of the number A has N terms.

When the series is correctly expressed, each of the coefficients or digits $a_0, a_1, a_3 \ldots a_{n-2}, a_{n-1}$ can only have one of two values, namely either 0 or 1, and it is usual to reproduce the value 0 by zero voltage and the value 1 by a definite voltage arbitrarily taken as unity. Thus, for example, the representation of the quantity A by voltages spaced in time in the form of an impulse train means that the train will consist of N consecutive impulse moments corresponding to the N terms of the series, the power or order ($2^0, 2^1, 2^2 \ldots 2_{n-1}$) of the terms being denoted by the order of occurrence of the impulse moments in time, while the value 0 or 1 of the digit of each term is denoted by the absence or presence of an impulse in the impulse moment of the order appropriate to that term. Such a time-distributed code may be called "live" as opposed to the "static" or space-distributed code. In the latter, the N terms of the series are denoted by as many different conductors or circuit elements and, being a binary-scale code, the value 1 or 0 of the digit of each term is usually denoted by the conductive or non-conductive condition of the appropriate conductor or circuit-element, the latter being of the "on-off" type, such as switches, relays, electronic gates or bi-stable trigger circuits of the flip-flop type, on which the code is impressed by a process of registration, the code so registered being capable of being turned into a "live" code by a reading-out process consisting in the application of code-reading signals to the conductors or circuit elements which, depending on whether they are conductive or non-conductive, do or do not allow the code-reading signal to pass through them.

Scale converters may be used in electric signal transmission apparatus, for example electronic computers, which are designed to carry out mathematical and like operations by acting upon signals coded to represent numerical quantities expressed in the binary scale, and where it is desired to have the results of the mathematical operation presented to the user in the denary scale.

The present invention is based on the known fact that, taking for example a number A such that its binary-scale expansion has only five terms, and writing these terms with those of the highest power or order at the left, the orders decreasing progressively to the right, viz:

$$A = 2^4 a_4 + 2^3 a_3 + 2^2 a_2 + 2 a_1 + a_0$$

the expansion can alternately be written in the following form $$A = [\{(2a_4 + a_3)2 + a_2\}2 + a_1]2 + a_0$$

More generally, where A is such that its binary-scale expansion has N terms written with the powers or orders decreasing from left to right, the series may be written as $$A = (((\ldots ((2a_{n-1} + a_{n-2})2 + a_{n-3})2 + \ldots a_1)2 + a_0$$

Accordingly, the invention provides a method of converting an electrical binary-scale code into the corresponding electrical denary-scale representation which consists in producing voltage impulses from the time-distributed or space-distributed code voltages in the sequence of decreasing powers or orders of the terms represented thereby, doubling the first voltage impulse so produced, adding thereto the next following impulse so produced, doubling the result of such addition, adding thereto the voltage impulse so produced following next after the preceding one, and so forth until all code voltages of the code representing the quantity have been dealt with by successive doubling and addition.

In order, however, to avoid the necessity of producing voltages of increasing values, it is proposed, in the practical performance of the method according to the invention, to add up impulses representing the denary values corresponding to the binary value progressively (or cumulatively) arrived at by the foregoing method, the impulses being therefore counted by means of denary counting chains or scaling circuits of any well-known step-by-step advancing type composed of scales-of-two, such as those constituted by chains of cascade-connected bi-stable trigger circuits, the successive actuation of which by the impulses counted causes the denary value recorded by the scaling circuit to advance progressively. Moreover, in order to avoid the necessity of producing actual impulses representing the denary value, the counting of which would occupy progressively increasing time intervals as the number to be recorded by the scaling circuit grows, it is further proposed so to constitute the scaling circuit that it incorporates means for causing the scaling circuit to advance by one step every time when a fresh binary-code voltage impulse is introduced and for thereupon causing the scaling circuit to advance to the position recording double the value recorded by the previous advancement; the doubling of the voltage impulses is thus carried out, not by actually producing twice the number of impulses, but by merely causing the counting or scaling circuit to behave as if twice the number of impulses had been counted by what may be termed "position-doubling" so as to record twice the number of impulses. This may be done by applying to a position-doubling channel provided in the scaling circuit a series of auxiliary impulses equal in number to the number of impulse moments of the binary coded train to be converted, an auxiliary impulse being applied either simultaneously with each binary-code train impulse provoking an advancement of the scaling circuit or out-of-phase with such impulse by not more than the duration of one impulse moment of the binary-code train.

Consequently, a scale converter according to the invention may be defined as comprising a step-by-step impulse counter constituted by a chain of cascade-connected bi-stable devices and adapted to advance by one step each time when a binary-code impulse is applied to its normal actuating channel, and a plurality of transfer stages having a separate actuating channel for application thereto of an auxiliary impulse during each impulse moment of the binary code, the input of each transfer stage being connected to the output of one of the bi-stable devices in such a manner that no transfer stage can deliver an output impulse unless the bi-stable device to which it is connected is in its actuated or working condition, and the output of each transfer stage being connected to an input of one of the bi-stable devices in such a manner that an output impulse from any transfer stage causes the counter to advance by as many steps as will cause it to record double the count which was recorded by the application thereto of the binary-code impulse that permitted the delivery of the output impulse from the transfer stage.

The term "bi-stable device" is herein intended to mean not only the well-known form of bi-stable trigger circuit (for example of the flip-flop type) which consists of two electron discharge tubes having the control grid and the plate of one tube connected to the plate and the control grid respectively of the other tube, but also any other electrical or electromechanical circuit element (for example a double-throw relay) which has two stable conditions or positions of equilibrium arbitrarily designated respectively as the condition or position of rest and the working condition or position, and which, when actuated, moves from one stable condition or position to the other and, in doing so, switches an applied voltage from one to the other of its output terminals; the choice of the form of circuit or circuit element for the bi-stable device depends upon the periodicity at which it is required to operate.

By "step-by-step counter" there is herein understood any chain of such bi-stable devices connected in cascade and adapted to "record" the number of impulses counted by "advancing" by a corresponding number of steps, which it does by the corresponding bi-stable device assuming its working condition or position, the arrangement being such that only one bi-stable device at a time can be in the working condition or position while all others are in the condition or position of rest.

By "transfer stage" is herein meant any switching circuit or circuit element designed to act as a gate which when actuated by application of a voltage thereto, becomes conductive and allows an impulse to pass therethrough for actuation of the associated bi-stable device; thus for example each transfer stage may be an electronic gating circuit constituted by a multi-grid electron discharge tube or it may be a single-throw relay.

The term "binary-code impulse" includes not only an impulse of an impulse train of regular periodicity in the time-distributed code but also a code-reading impulse for reading out a space-distributed code registered on conductors or circuit elements in the manner hereinbefore described.

In order to enable the invention to be readily carried into effect, a few forms of scale converter embodying the invention and their manner of operation in carrying out the method according to the invention, will now be described, by way of example with reference to the accompanying drawings wherein.

Figure 2:
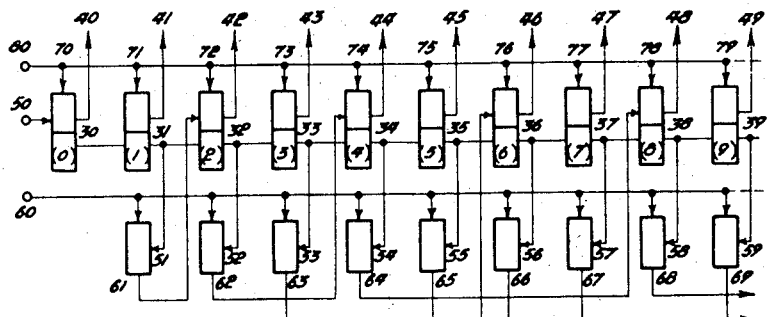
Fig. 2 is a block schematic diagram showing a step-by-step impulse counter arranged to operate as a scale converter according to the invention.
Figure 3:
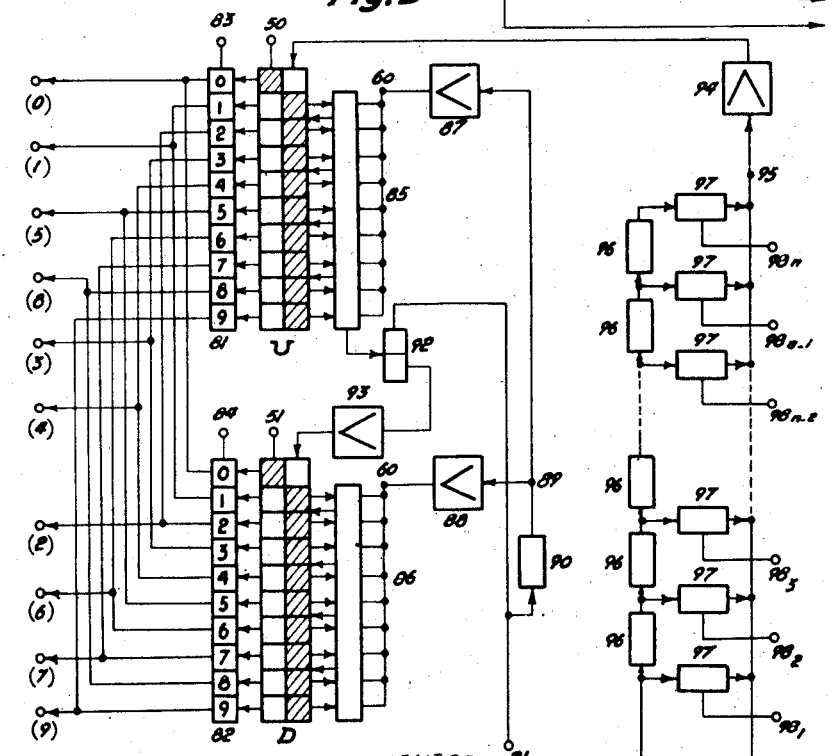
Figure 4:
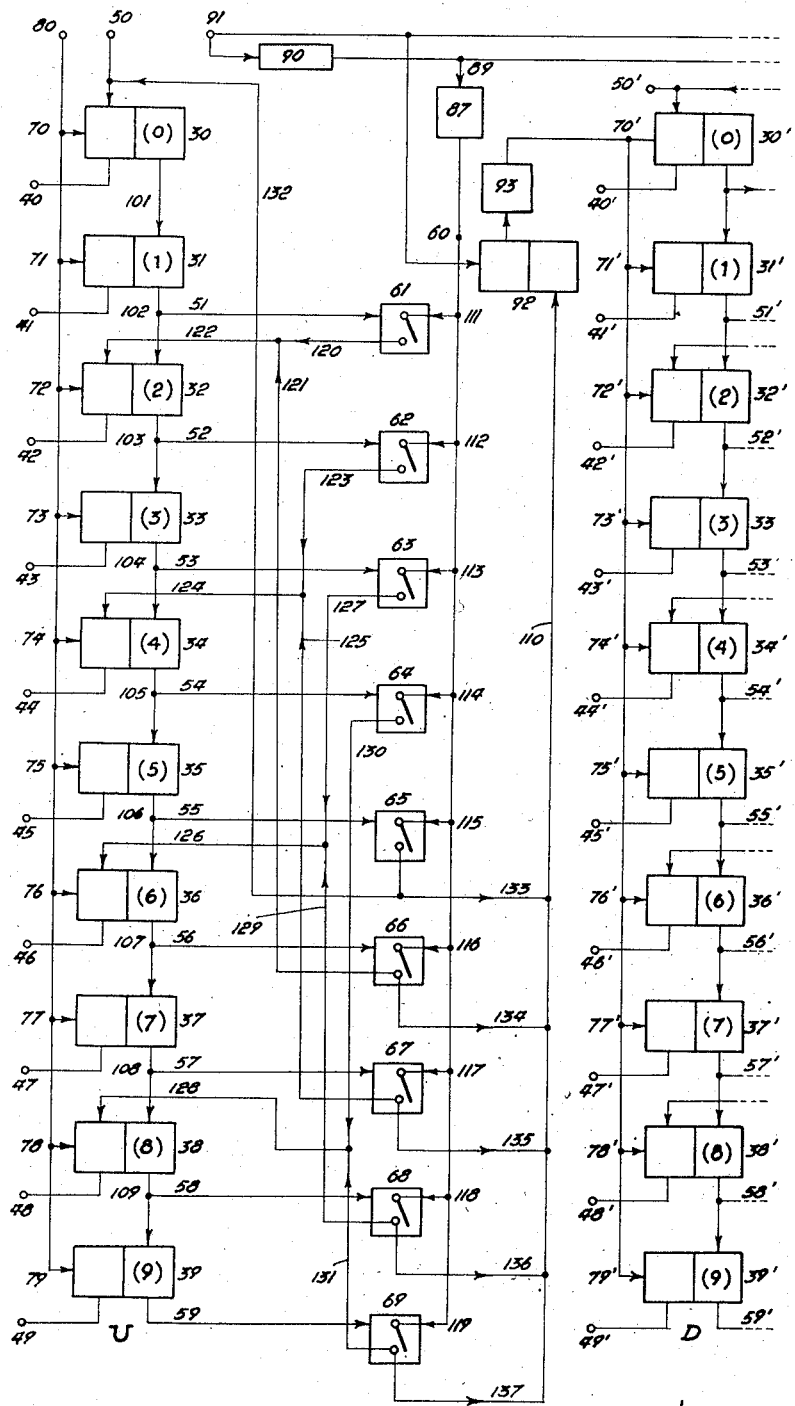

Fig. 3 diagrammatically shows a scale converter embodying the invention with the impulse counter arranged in separate scale-of-ten circuits, this scale converter being designed to deal with a time-distributed binary code consisting of a precoded impulse train of regular periodicity which has the impulse moments repersenting the terms of the lowest orders at its head;

Fig. 4 is a block schematic diagram showing in greater detail the first two scale-of-ten circuits of a scale converter according to Fig. 3;

Fig. 5 is a circuit diagram showing the circuit elements and connections of one of the scale-of-ten circuits of Fig. 4;

Fig. 6 is a block schematic diagram similar to Fig. 2, but showing a modification thereof; and Fig. 7 is a circuit diagram for part of a scale converter according to Fig. 6, but arranged in separate scale-of-ten circuits in a manner similar to Fig. 5.

Figure 1:
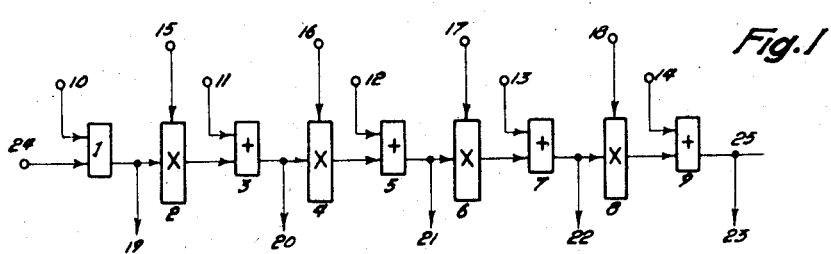
Figure 1 is an explanatory diagram showing, in an elementary fashion, the general organization of a scale converter for carrying out the method according to the invention.

Referring first to Fig. 1, there is indicated at 1 the input circuit of the scale converter which is constituted by a chain of cascade-connected impulse-doubling circuits 2, 4, 6, 8 etc. between which are inserted impulse-adding circuits 3, 5, 7, 9 etc. The reference numerals 10 to 14 designate input terminals to which are respectively applied the impulse moments of the binary code to be converted, beginning with those representing the terms of the highest orders of the binary-scale expansion of the numerical quantity, the impulse moment representing the term $n-1$ being applied to the terminal 10, that representing the term $n-2$ to the terminal 11, and so forth in succession down to the impulse moment representing the term of order or power 0. At 15 to 18 are shown terminals to which are applied auxiliary impulses controlling the impulse-doubling operation. Intermidate results can be obtained from output terminals denoted by the reference numerals 19 to 23. A control signal which starts the scale-converting operation is applied at 24 and, in effect, travels right through the scale-converter by the channel 25 connecting the various stages thereof.

Let it be assumed by way of example, that the impulse-doubling and the impulse-adding circuits are of the known kind incorporating delay lines, with interpolation of wave-form regenerating stages if necessary; thus, the impulse-doubling circuit 2 might consist of two parallel channels, one with and the other without delay, both connected to the control grid of a gating stage rendered conductive by an auxiliary impulse applied at 15; the impulse-adding circuit 3 might likewise consist of two channels, one with and the other without delay, the delay channel having an impulse delivered thereinto by a flip-flop circuit triggered by an impulse of the coded train applied at 11, while the other channel receives the output signal from the preceding impulse-doubling circuit, both channels being connected to the input of a peak-clipping or amplitude-limiting stage. Now, with such an arrangement, if the impulse moments of the coded train, having been conveniently stored for this purpose, are simultaneously applied to the terminals 10 to 14 respectively, while at the same time a starting impulse is applied at 24, the first impulse moment of the train (which, representing the term of the highest order, will contain an impulse of unity in succession down to the impulse moment representing the term of order or power 0). At 15 to 18 are shown terminals to which are applied auxiliary impulses controlling the impulse-doubling operation. Intermediate results can be obtained from output terminals denoted by the reference numerals 19 to 23. A control signal which starts the scale-converting operation is applied at 24 and, in effect, travels right through the scale-converter by the channel 25 connecting the various stages thereof.

Let it be assumed by way of example, that the impulse-doubling and the impulse-adding circuits are of the known kind incorporating delay lines, with interpolation of wave-form regenerating stages if necessary; thus, the impulse-doubling circuit 2 might consist of two parallel channels, one with and the other without delay, both connected to the control grid of a gating stage rendered conductive by an auxiliary impulse applied at 15; the impulse-adding circuit 3 might likewise consist of two channels, one with and the other without delay, the delay channel having an impulse delivered thereinto by a flip-flop circuit triggered by an impulse of the coded train applied at 11, while the other channel receives the output signal from the preceding impulse-doubling circuit, both channels being connected to the input of a peak-clipping or amplitude-limiting stage. Now, with such an arrangement, if the impulse moments of the coded train, having been conveniently stored for this purpose, are simultaneously applied to the terminals 10 to 14 respectively, while at the same time a starting impulse is applied at 24, the first impulse moment of the train (which, representing the term of the highest order, will contain an impulse of unity amplitude, i. e. will not be of zero voltage) may be used to render conductive the input circuit 1 (e. g. a gate) so that the starting impulse passes through the input circuit 1 and enters the impulse-doubling circuit 2, from which it emerges as a signal consisting of two spaced impulses, the gating stage of the impulse-doubling circuit, being held conductive for long enough to pass both impulses. These two impulses then reach the amplitude-limiting stage of the impulse-adding circuit where, if the flip-flop has been actuated (i. e. if the next impulse moment of the coded train at the terminal 11 contains an impulse), a third impulse is added to the signal. If the next impulse moment of the train does not contain an impulse, then the flip-flop will have remained unactuated, and the signal will proceed in the form of two impulses. It will then reach the next impulse-doubling circuit 4, from which it will emerge as a signal consisting of six (or, as the case may be, four) impulses, and a further impulse, making the total seven (or, as the case may be, five) impulses, will be added to the signal in the next impulse-adding circuit 5 if the third impulse moment of the train (that representing the term of the order $n-3$) contains an impulse (i. e. if the digit of that term is of value 1). This process repeats itself as the composite signal traverses the scale converter, until finally the composite signal consists of the number of impulses corresponding to the denary-scale expression of the numerical quantity represented in the binary scale by the coded impulse train thus converted. The process stops when the composite signal encounters a non-conductive impulse-doubling circuit, which means that the binary-code impulse train has been exhausted (since the number of auxiliary impulses applied at 15 to 18 is the same as the number of impulse moments of the coded train), the last significant digit of the binary number having been added to the composite signal in the impulse-adding circuit immediately preceding the impulse-doubling circuit at which the process came to a stop. Assuming this impulse-adding circuit to be that denoted 9 in Fig. 1, the composite signal is drawn off at 23, and it only remains to count the number of impulses making up that signal and to obtain an indication of the total.

Although it would be possible to design and produce a scale converter of the form just described, incorporating delay-channels and switches or gates, it would entail the use of a great deal of equipment, and since an impulse counter and totalizer would have to be added in order to obtain the final result, it is preferred to base a practical scale converter on the impulse-totalizer itself, using for that purpose a step-by-step impulse counter as hereinbefore defined. An example of such a scale converter is shown in Fig. 2 and a modification thereof in Fig. 6.

The impulse counter shown in Fig. 2 will be considered in the first place as a continuously progressing chain, as opposed to the kind comprising separate scale-of-ten circuits which will be described later on. Only the first ten stages of the counter are shown and denoted 30 to 39, each stage consisting of a bi-stable device which will hereinafter be assumed to be a bi-stable trigger circuit of the flip-flop type having a working condition and a condition of rest which will be abbreviated to W condition and R condition respectively. The arrangement is such that only one stage can be in the W condition at any time, all the other being in the R condition. The main channel (unnumbered) by which the stages 30 to 39 are connected in cascade for step-by-step advancement of the counter corresponds to the channel 25 in Fig. 1. The output connections for intermediate or final results corresponding to those numbered 19 to 23 in Fig. 1 are here indicated at 40 to 49. As the counter is a step-by-step device intended to register a decimal figure or number, starting from the general rest condition with stage (0) in the W condition, the output 40 in this condition will mark by its voltage the decimal figure 0; when the stage (0) has been restored to rest and the stage (1) becomes operative, the output 41 of stage (1) will mark by its voltage the decimal figure 1: and so on.

As this progression will continue until the entering coded train is completed, any output made active before the end of the entering code will mark an intermediate result; at the end of the entry of the code to be translated, a single stage will remain operative in a chain such as in Fig. 2, or Fig. 6 (not sub-divided into tens) and will mark the decimal figure or number corresponding to its order. Connections 51 to 59 taken from the main channel between the stages 30 and 39 fulfill the function of the terminals 15 to 18 in Fig. 1, to control the impulse-doubling circuits 2, 4, 6, 8 etc.; the latter are replaced in Fig. 2 by transfer stages 61 to 69 which, instead of doubling the actual impulses, produce what may be termed position-doubling, i. e., they advance the position of the counter so that it shows a count of double the number of the impulses that have in fact been applied thereto.

When the scale converter is not in operation, the first stage 30 thereof is in the W condition, all others being in the R condition. This is the normal or rest condition of the impulse counter as a whole. A terminal 50, corresponding to the terminal 24 of Fig. 1, serves for the application of a starting signal to the scale converter when the latter is taken into use. The binary-coded train impulses are applied in succesion to a channel 80 comprising connections 70 to 79 to all the stages, and the channels 70 to 80 thus constitute the normal actuating channel of the counter, that is to say, the channel by which the counter would be caused merely to record the number of binary terms of the numerical quantity if it were not for the position-doubling and position-adding arrangements to be described. The application of the starting signal to the terminal 50 has for effect that the appearance in the channel 80 of the first impulse moment of the coded train containing an impulse causes the first stage to flip over to its R condition and the second stage 31 consequently to flip over to its W condition.

The actuation of the counter stages for position-doubling (as opposed to their normal actuation) is effected by means of output impulses from the transfer stages 61 to 69 derived from an input signal applied thereto at 60 in the form of a series of auxiliary impulses, each auxiliary impulse being timed to occur immediately after the beginning of an impulse moment of the coded train in the channel 80, regardless of whether that impulse moment contains an impulse or not, there being as many auxiliary impulses as the train has impulse moments. In the arrangement of Fig. 2, and assuming that it deals with coded trains of regular periodicity $\theta$ the auxiliary impulses are delayed to occur $\theta/2$ after the beginning of the impulse moments of the coded train.

The output of the transfer stage 61 is connected to an input of the counter stage 32 for actuation thereof, and similarly the transfer stage 62 is connected to the counter stage 34, the transfer stage 63 to the counter stage 36, and so forth the output of each transfer stage being connected to an input of that counter stage which, when actuated to W condition, records a count twice as high as that which would be recorded by the W condition of the counter stage controlling the conductivity of that particular transfer stage.

In Fig. 2 it is the auxiliary impulses applied at 60 which pass through the transfer stages 61 to 69 selectively rendered conductive by the output of the counter stages 31 to 39 through the channels 51 to 59. In the modified embodiment shown in Fig. 6 (and this is the only difference between these two embodiments) it is the auxiliary impulses applied at 60 which render conductive the transfer stages 61 to 69 and accordingly all of them are rendered conductive simultaneously but the only transfer stage which effects a position-doubling operation is the one to which at any time an output impulse of the associated counter stage is applied, such output impulse passing through the transfer stage. The effect, as will be obvious, is the same, but as a necessary consequence the auxiliary impulses, in the embodiment of Fig. 6, must be in phase with the impulse moments of the coded train appearing in the channel 80. In order, however, to give the bi-stable trigger stages 30 to 39 the time necessary for correct operation, delays are provided in Fig. 6 in the output connections of the transfer stages, as indicated at 141 to 144. Moreover, in the case of Fig. 6, an uninterrupted series of impulses of the same periodicity as those applied at 60 is applied at 50 in order to ensure that the bi-stable trigger stages of the counter produce output impulses for application to the transfer stages even when any of the impulse moments of the coded train in the channel 80 do not contain an impulse; but these auxiliary impulses applied at 50 do not cause the counter to advance step-by-step, since this can only be done by impulses applied at 80 and the only effect of an impulse applied at 50 to the counter stage 30 is a tendency to return that stage to the W condition and hence to restore the whole counter to rest, though such restoration cannot become effective because of the transfer or position-doubling operation actively in progress at that time.

Considering now in greater detail the embodiment of Fig. 2, in the first place, its operation is as follows:

An impulse applied to any one of the bi-stable trigger stages 30 to 39 of the impulse counter through the channel 80 has for effect to trigger that stage to, or confirm it in its R condition; an impulse applied to any one of these stages from elsewhere (from the terminal 50 or from the preceding stage via the main channel or from the associated transfer stage) has for effect to trigger that counter stage to, or confirm it in, its W condition. At the beginning of the operation, the impulse counter is at rest, i. e. with the stage 30 in the W condition and all other stages in the R condition. The operation is started by the application at 50 of a starting voltage to the stage 30 so that upon the appearance in the channel 80 of the first impulse moment of the coded train containing an impulse the latter, applied to stage 30 through the connection 70, causes the stage to flip over to the R condition. In doing so, it delivers an output impulse which actuates the stage 31 to the W condition. The stage 31, in flipping over to the W condition delivers an impulse which is of polarity unsuited to the actuation of the next counter stage 32 to its W condition (since flip-flop devices are normally adapted to respond only to impulses of a predetermined polarity), but suited as a gating signal for the transfer stage 61 which is thereby rendered conductive. Shortly after the appearance of the coded train impulse which caused these operations, an auxiliary impulse is applied at 60 which, the transfer stage 61 being at this time conductive, passes therethrough and actuates the counter stage 32 to its W condition, the stage 31 automatically returning to the R condition. This follows since, if one stage is put into the W condition, the stage which was previously in W is automatically put over to the R condition (see Fig. 5, for example). Thus, the position-doubling operation has been duly carried out: for one impulse applied at 80, the counter has advanced by two steps to a position corresponding (in a normal step-by-step impulse counter) to the application to its normal actuating channel of two impulses. After the first impulse at 80, which is an impulse of the entering coded train, there is produced, as explained, an auxiliary timing impulse at 60, and the counter advances by two steps. The timing impulse doubles the internal count of the counting chain. For a first impulse at 80, the condition of the counter is such that it advances two steps.

Let us now suppose, in the first place, that the second impulse moment of the coded train appearing in the channel 80 contains no impulse, so that there is no position-adding (corresponding to the impulse-adding in the description of Fig. 1) to be done; obviously then the next step is another one of position-doubling. When the counter stage was actuated to the W condition as a result of the previous position-doubling operation, it produced an output impulse which had no effect on the next counter stage 33, but it made the transfer stage 62 conductive. Just after the appearance of the second impulse moment (zero amplitude) of the coded train, the second auxiliary impulse is applied at 60 and passes through the transfer stage 62, now conductive, to the counter stage 34 which is thereby triggered to its W condition, the stage 32 returning to its R condition. Thus, the second step of position-doubling has been effected, and if there is no impulse in the third impulse moment of the train either, then the process is repeated and the counter will advance by four steps from position (4) to position (8), the counter stage 38 assuming the W condition.

However, supposing that the second impulse moment of the coded train in the channel 80 did contain an impulse, then that impulse will confirm all counter stages in their R condition except the stage 32 which, being applied thereto through the connection 72, it finds in the W condition and immediately restores to the R condition before occurrence of the second auxiliary impulse at 60. The stage 32, in flipping over to the R condition, produces an output impulse which is of the wrong polarity for rendering conductive the transfer stage 62, so that that transfer stage, left conductive by the previous position-doubling operation, is now immediately rendered non-conductive. The output impulse of the counter stage 32 is however of the right polarity for triggering the next counter stage 33 to its W condition so that the impulse counter advances by one step from position (2) to position (3); thus the position-adding operation is effected which is of course nothing more than the normal one-step advance of a step-by-step counter when another impulse is presented to it for counting. The counter stage 33, in assuming the W condition, makes the transfer stage 63 conductive, and shortly afterwards the second auxiliary impulse occurs at 60, passes through the conductive transfer stage 63 and triggers the counter stage 36 to its W condition, the stage 33 returning to the R condition. The second position-doubling operation is thus completed, the counter having moved by three steps from position (3) to position (6). If the third impulse moment of the coded train appearing at 80 does not contain an impulse, the next operation will be another position-doubling one, the counter advancing from position (6) to position (12) which is not shown in Fig. 2; if on the other hand the third impulse moment of the coded train does contain an impulse, there will first be a position-adding operation, the counter advancing by one step from position (6) to position (7), followed by a position-doubling operation which advances the counter to position (14) not shown.

Considering, in the second place, the embodiment of Fig. 6, its operation is similar and will be roughly outlined in what follows, with the emphasis on the differences between Figs. 2 and 6:

The impulse counter being at rest, with the stage 30 in the W condition, the first impulse moment of the coded train containing an impulse turns the stage 30 to its R condition to advance the counter by one step and place the stage 31 in the W condition which delivers an impulse to the transfer stage 61. Substantially simultaneously the first auxiliary impulse is applied at 60 and renders all the transfer stages conductive, so that the output impulse from the counter stage 31 passes through the transfer stage 61 and is used to trigger the counter stage 32 to its W condition, but only after being delayed at 141 for long enough to prevent the triggering of the stage 32 from coinciding with either the first or the second impulse moment of the train appearing at 80 and, hence, with either the first or the second auxiliary impulse appearing at 60. Consequently the output impulse of the stage 32 due to its flipping over to the W condition cannot pass through the transfer stage 62 because the latter is no longer, or not yet, conductive, and so it cannot trigger the counter stage 34, which would clearly be undesirable. After a time interval of $\theta$, the second auxiliary impulse is applied simultaneously at 50 and at 60. If the second impulse moment of the coded train appearing at that instant in the channel 80 contains no impulse, then the auxiliary impulse applied at 50 becomes effective and triggers the counter stage 30 back to its W condition, so that the counter stage 32, which was left in W condition by the previous operation, reverts to its R condition and, in doing so, produces an output impulse which is applied to the transfer stage 62, now rendered conductive by the auxiliary impulse from 60, and so, after a suitable delay effected by the delay element 142, the counter stage 34 is triggered to its W condition, whereby the stage 30 is restored to its R condition. If, on the other hand, the second impulse moment of the coded train does contain an impulse, it acts, through the connection 72, to cause the counter stage 32, left in W condition by the previous operation, to revert to its R condition and to deliver an output impulse which actuates the next following counter stage 33 to the W condition, but the second auxiliary impulse simultaneously applied at 50 causes the counter stage 30 to go back to the W condition and therefore the counter stage 33 immediately returns to its R condition and, in doing so, delivers an output impulse which passes through the transfer stage 63 rendered conductive at that instant by the second auxiliary impulse from 60, whereby after suitable delay by the element 143 the counter stage 36 is triggered to, and alone remains in, the W condition, the counter stage 30 being restored to its R condition. The process continues in this way during the succeeding impulse moments of the coded train appearing in the channel 80, and its effect will be seen to be the same as in Fig. 2.

As is well known, any denary impulse counter, including the type embodied in the present scale converter, can be split up into separate scales-of-ten, i. e. counting chains which respectively record the units, the tens, the hundreds etc., a scale-of-ten being a circuit which records nine impulses and recycles at the tenth impulse which causes the circuit to revert to rest (recording 0 impulses) but at the same time to produce a single output impulse which can be used to actuate the next scale-of-ten so that it will record 1. It will be seen from the preceding description that the conversion into the denary scale of a binary number having a large number of digits would require a large number of counter stages, each comprising a bi-stable trigger circuit, and that consequently a considerable saving of material can be made basing the present scale converter on a counter arranged in scales-of-ten. The manner of doing this will be readily apparent, but nevertheless the figures of the accompanying drawings still to be described show scale converters arranged in scales-of-ten to make the matter quite clear. Thus Fig. 3 shows a scale converter which, for greater clarity of the drawing, shows the scales-of-ten in highly diagrammatic form and is confined to only two scales-of-ten, the main purpose of the figure being to give an example of a scale converter designed to meet the most exacting condition in that it is required to deal with coded impulse trains appearing in the sequence of increasing orders i. e., with those impulse moments at the head which represent the binary terms of the lowest orders or powers (0, 1, 2 etc.), while the impulse moments representing the terms of the highest orders or powers occur last, with at the tail impulse moment for the term of the order $n-1$.

Referring now to Fig. 3 the two scales-of-ten for the units and tens respectively are designated U and D, each having ten counter stages indicated by rectangles having either the left or the right half shaded to indicate the W or R condition thereof. The output connections for the conversion results corresponding to those numbered 40 to 49 in Fig. 2 are shown in Fig. 3 as leading to reading-out circuits 81 and 82 respectively, each consisting of ten stages to which the outputs of the ten counter stages are respectively connected. Each stage of the circuits 81 and 82 may comprise, for example, a gate in the form of an electron discharge tube which has one of its grids connected to the output of the corresponding bi-stable trigger stage of the impulse counter whereby the tube is rendered conductive or non-conductive according to whether the associated trigger stage of the counter is in W or in R condition; whenever it is required to obtain an indication of the final result of the conversion a code-reading signal, e. g. an impulse, is applied first to a terminal 83 for the scaling circuit U and then to a terminal 84 for the scaling circuit T and thence to the control grids of all the gating tubes jointly, so that only the particular gate which is open (rendered conductive) passes the code-reading signal. This reading-out arrangement is only shown here by way of example to recall to mind the possibility of extracting from an impulse counter, for such purposes as remote control, electric signals representing numerical quantities recorded by the scales-of-ten.

The position-doubling transfer stages are diagrammatically shown in Fig. 3 as one whole for each scale-of-ten, designated 85 and 86 respectively. The input terminals 60 for the two groups of transfer stages are supplied with auxiliary impulses from impedance-matching amplifiers 87 and 88 respectively which receive impulses from a common point 89 to which they are applied by a delay element 90 from an input terminal 91. The delay effected by the element 90 shifts the phase of the auxiliary impulses by $\theta/2$ with respect to the impulse moments of the coded train to be converted, the latter being in phase with the auxiliary impulses applied at 91. It will be seen therefore that this arrangement is suitable for the embodiment of Fig. 2 rather than that of Fig. 6 in which no such phase-shift is required before application of the auxiliary impulses at 60.

The same series of auxiliary impulses from the terminal 91 is applied, without delay, to a bi-stable trigger or flip-flop circuit 92 which controls the transfer of impulses from the scaling circuit U to the scaling circuit T whenever the former is actuated in such manner as would advance it beyond position (9). Such transfer takes place via a combined amplifier and wave-form reshaper 93, the actual impulse transferred being derived from the circuit 85 in a manner which will be made apparent hereinafter with reference to Fig. 4.

In a case where the coded impulse train representing the binary-scale expression of the numerical quantity appears with its impulse moments in the sequence of increasing orders or powers, it is necessary to invert the train, i. e. turn it round so that its head becomes its tail and vice versa, before it enters the channel 80 of Fig. 2 (not indicated in Fig. 3) through an amplifier 94. For this purpose, the input terminal 95 of the amplifier 94 is preceded by what may be termed an "order-inverting" circuit constituted, for example, as follows:

An artificial delay line consisting of $N-1$ sections 96, each of delay time or electrical length $2\theta$ (where N is the maximum number of impulse moments of any train to be dealt with by the scale converter, and $\theta$ is the periodicity i. e. the duration of each impulse moment), has N taps connected by switches 97 (for example electronic gates normally non-conductive) to the terminal 95. The gates 97 are rendered conductive, one by one, at time intervals $\theta$ by the application of gating impulses distributed onto terminals $98_1$, $98_2$ ... $98_{n-1}$, $98_n$ in that order, the first gating impulse being applied at $98_1$ after a time interval $N\theta$ from the appearance of the first impulse moment of the coded train at the input terminal of the delay-line, here designated 99. After this time interval, of course, the last or Nth impulse moment of the train (representing the term of the order $n-1$) will have appeared at the input of the gate 97 controlled by the terminal $98_1$ and will be allowed through by the gating impulse for application to the input terminal 95 of the amplifier 94; after a further interval $\theta$, the last-but-one impulse moment of the train (representing the term of the order $n-2$) will appear at the input of the next gate 97 which is at that instant rendered conductive by the next gating impulse applied to $98_2$, the impulse moment of order $n-2$ being likewise applied to the terminal 95. This process continues, each impulse moment of the train being successively gated onto the terminal 95 until finally the first impulse moment (i. e. that representing the term of the lowest order or power 0) is applied to the terminal 95 by the gating impulse from $98_n$. Thus, after a time interval of $N\theta$ from the appearance at 99 of the last impulse moment of order $n-1$, it reappears at 95 as the first impulse moment, and the other impulse moments follow at their previous periodicity but in the reverse sequence, namely that of decreasing orders or powers, as is necessary for the proper operation of the scale converter. The channel by which the outputs of all the gates 97 are connected to the terminal 95 is provided with an input terminal 100 to which can be applied any coded trains which are already arranged in the correct sequence of decreasing orders and therefore do not require to be passed through the "order-inverting" circuit 96–98.

Fig. 4 shows the scale-of-ten U of Fig. 3 in greater detail though still in block schematic form, and also part of the scale-of-ten D. The reference numerals used in Fig. 4 are the same as those used for the corresponding circuit elements in Fig. 2 in so far as such elements are shown at all in Fig. 2, the reference numerals for the circuit elements of the scaling circuit D being provided with an apostrophe (').

The scaling circuit U comprises ten bi-stable trigger stages 30–39 cascade-connected by conductors 101 to 109 so as to advance step-by-step, an advancement of one step being effected every time when one of the stages is triggered from the W to the R condition. By means of connections 70–79 from the normal actuating channel 80 any stage in the R condition is triggered to the W condition. As already stated, the general condition of rest of the whole scaling circuit is that in which the stage 30 alone is in the W condition. Since the arrangement is such that only one stage can at any time be in the W condition, it follows that the scaling circuit must operate on the step-by-step principle.

The transfer stages 61–69 are here shown as relays controlled by voltages in the connections 51–59 respectively, from the conductors 101–109 respectively. The input terminals of the transfer stages 61–69 are respectively indicated at 111–119 and are jointly connected to the terminal 60. The output connections from the transfer stages are arranged as follows: from the transfer stages 61 and 66 connections 120 and 121 respectively lead to one of the trigger inputs, here designated 122, of the scaling circuit stage 32; from the transfer stages 62 and 67 connections 123 and 125 respectively lead to a trigger input 124 of the scaling circuit stage 34; from the transfer stages 63 and 68 connections 127 and 129 respectively lead to a trigger input 126 of the scaling circuit stage 36; from the transfer stages 64 and 69 connections 130 and 131 respectively lead to a trigger input 128 of the scaling circuit stage 38; from the transfer stage 65 a connection 132 leads to the trigger input of the scaling circuit stage 30 to which the input terminal 50 for the auxiliary impulses is also connected; in addition, there are output connections 133 to 137 only from the transfer stages 65 to 69 inclusive respectively via a common channel 110 to the trigger circuit 92 which controls the transfer of impulses from U to D when a count of nine is exceeded.

The operation of the scale converter circuit of Fig. 4 will not require any further description as it will be evident from the detailed description given with reference to Fig. 2. It should be noted however that in Fig. 4, as soon as the counter has advanced by sufficient steps for the position-doubling operation to be effected by one of the transfer stages 65 to 69 inclusive, the scaling circuit U is placed in a position which records the denary units digit only of the doubled count; thus, where it was stated in the description of the operation of Fig. 2 that, as a result of a position-doubling operation, the counter might advance, for example, from position (6) to position (12), which would of course be effected by the transfer stage 66, the corresponding operation of Fig. 4 would be for the output impulse from the transfer stage 66 to be applied via the connection 121 to the trigger input 122 of the scaling circuit stage 22, thus causing the latter to flip over to the W condition so that the counter is then in position (2) and records a count of two units. At the same time, however, any such position-doubling operation by one of the transfer stages 65–69 inclusive causes an output impulse to be applied to the channel 110, the result being that the stage 31' of the scaling circuit is triggered to its W condition, T having thus advanced to its position (1) so that in the example just quoted the counter as a whole may be regarded as being in position (12) in that it duly records a total count of twelve (one ten and two units). The transfer of an impulse from one of the stages 65–69 of the scaling circuit U to the scaling circuit T is effected as follows: The impulse in the channel 110 is applied to the flip-flop stage 92 which is periodically being restored to its rest condition by the recurrent series of auxiliary impulses that are applied at 91 (see also Fig. 3) and are in phase with the impulse moments of the coded train appearing at 99 or 100. When the flip-flop stage 92 has been triggered to its working condition by an impulse in the channel 110, it is therefore returned to its rest condition by the next following auxiliary impulse from 91 and consequently delivers an output impulse to the amplifier 93, whence the output impulse is applied at 70' to the stage 30' of the scaling circuit T, triggering that stage to its R condition and the stage 31' to its W condition. If an auxiliary impulse from 91 finds the flip-flop stage 92 already in its rest condition, there having been no previous actuation of the stage 92 from the channel 110, then the auxiliary impulse merely confirms the stage 92 in its rest condition, and no output impulse is delivered to the amplifier 93.

At the end of a counting operation, a number will have been recorded on each scale-of-ten, digit by digit, indicating the final count in the denary scale. The beginning of the conversion of the next following binary-coded impulse train is then initiated by a starting impulse applied at 50 and 50' which causes the stages 30 and 30' to return to the W condition, the whole counter being restored to rest and the record of the previous count being effaced. It should be noted, however, that the restoration of the counter to rest need take up no appreciable time, the starting impulse being applied at 50 substantially simultaneously with the appearance of the first impulse of the next coded train in the channel 80, allowance being made merely for the flip-over time of the bi-stable trigger stages upon the counter returning to the general condition of rest.

An example of electronic lay-out for a scale converter according to Fig. 4', is shown in the circuit diagram of Fig. 5 which however only shows part of one of the scale-of-ten circuits. The reference numerals used in Fig. 5 are the same as those used for the scaling circuit U in Fig. 4, except for some circuit element not shown in Fig. 4. The cascade of bi-stable trigger circuits (30–39) forming the stages of the counter is of well-known type, each bi-stable trigger stage comprising two electron discharge tubes (here shown as consisting of two discharge paths in a single envelope) symmetrically interconnected and adapted to pass from one condition of stable equilibrium to the other by application of suitable triggers either to one or the other of the two control grids of the stage or to one of its cathodes, the latter method of triggering being made possible by suitable choice of the values of cathode resistances 138 and 139 common to all stages and being used to trigger the stage from W to R condition by means of the impulses of the coded train in the normal actuating channel 80, while the former method is used to trigger the stage from R to W condition by means of impulses from the preceding counter stage or the associated transfer stage. The transfer stages (61–69) are each constituted by an electronic gate comprising a single electron discharge tube having a control grid circuit 140 to which are applied the auxiliary impulses from the terminal 60; each tube is a pentode the suppressor grid of which is connected to the appropriate one of the conductors 51 to 59 for control of the condition of a conductivity of the tube by a gating impulse from the output of the associated counter stage, while the screen grid is connected to the H. T. supply via a resistance 150, but from the transfer stage 65 onwards (and including that stage) a common screen grid load resistance 151 is provided, and it is the voltage drop across the load resistance 151 which is utilized as the impulse to be transferred to the next scale-of-ten through the output connections 133 to 137. The use of the same reference numerals for corresponding circuit elements in Figs. 4 and 5 makes unnecessary any more detailed description of the circuits of Fig. 5 and their operation.

In like manner, the circuit diagram of Fig. 7 requires no separate description, since its operation corresponds to that previously described with reference to Fig. 6 modified only in that, just as the circuit of Fig. 5 is in substance the scale converter of Fig. 2 arranged in separate scales-of-ten, so the circuit of Fig. 7 is in substance the scale converter of Fig. 6 arranged in separate scales-of-ten and, like Fig. 5, Fig. 7 only shows part of one scale-of-ten. Suffice it to say that the gating tubes constituting the transfer stages (61–69) have their control grids connected to conductors 151 to 159 (of which only 151–154 are shown) from the output circuits of the associated counter stages (30–39), whereas their suppressor grids are connected to the terminal 60 for control of their condition of conductivity by the auxiliary impulses which, in this case, act as gating impulses and are in phase with the impulse moments of the coded train appearing in the channel 80, the delay circuit 90 provided in Figs. 3 and 4 (and of course in Fig. 5 as well, though not shown therein) being omitted in the arrangement according to Fig. 7; the delay elements 141 to 149 of Fig. 6 are however provided in Fig. 7 in which only two of them, 141 and 142, are shown, their purpose being to avoid any undesired cancellation of a position-doubling operation by the simultaneous actuation of a counter stage by an impulse of the coded train and a position-doubling impulse from a transfer stage, since the latter impulse is in effect constituted by the same train impulse which has passed through, and has been regenerated in, the transfer stage.

It will be apparent to those versed in the art that the embodiments described in the foregoing can be modified in many respects, especially as regards details of circuit design, such as the use of different bi-stable devices or of differently connected bi-stable trigger circuits or of counters with scaling circuits actuated by any other known method.

I claim:

1. A scale-conversion apparatus for converting a numerical quantity expressed in the binary scale of notation to the corresponding expression of said quantity in the denary scale of notation, comprising: a step-by-step impulse-counter channel; a chain of cascade-connected bi-stable switching devices in said channel; a normal actuation path for said channel; means for applying binary-code impulses to said normal actuation path, adapted to advance said counter by one step for each applied impulse; a plurality of impulse transfer stages; one separate actuation path for said stages; means for applying an auxiliary impulse to said separate path during each impulse period of the binary code; means for individually connecting the outputs of said transfer stages to the outputs of said switching devices; means for preventing delivery of an output impulse from said transfer stage unless the corresponding switching device is in an operative condition; means for connecting the output of each said transfer stage to an input of one of said switching devices, whereby an output impulse transmitted by said transfer stage advances said counter by as many steps as will cause it to register double the count recorded in respect of the binary code impulse which permitted the passage of said output impulse from the transfer stage.

2. A scale-conversion apparatus for converting a numerical quantity expressed in the binary scale of notation to the corresponding expression of said quantity in the decimal scale of notation, and comprising: a step-by-step impulse-counter channel; a chain of cascade-connected bi-stable switching devices in said channel; a normal actuation path for said channel; means for applying binary-code impulses to said normal actuation path, whereby said counter is adapted to advance one step for each applied impulse; a plurality of parallel-input transfer stages adapted to double the registrations of said counter channel; means for selectively coupling the outputs of said transfer stages to the inputs of said switching devices; one separate actuation path for said transfer stages; means for applying auxiliary impulses to said separate path at each period of said binary-code impulses; means for individually connecting the outputs of said switching devices to the inputs of said transfer stages; and means for preventing said transfer stages from doubling the forward steps of said counter channel, due to the binary-code impulse, when said switching devices are inoperative.

3. A scale-conversion apparatus as set forth in claim 2, in which one only of the said bi-stable switching devices is capable of remaining in a position of equilibrium different from that of the remainder of said devices.

4. A scale-conversion apparatus as set forth in claim 1, and comprising: in said impulse-counter channel, a cascade-connected series of double-triode electron tubes having separate sets of cathode, grid and anode electrodes; output circuits individual to the anode and cathode of each triode assembly, certain of said tubes constituting bi-stable trigger circuits and others of said tubes acting as step-by-step advancing circuits; and transfer circuits associated with the outputs of said electron tubes, said transfer circuits each including pentode electron tubes having a cathode, an anode, a control grid, a suppressor grid and a screen grid, connections from the individual screen grids of said pentode tubes to the individual output circuits of the said triode tubes, and a common output circuit for said transfer circuits.

5. A scale-conversion apparatus as set forth in claim 1, and comprising: in said impulse-counter channel, a cascade-connected series of double-triode electron tubes having separate sets of cathode, grid and anode electrodes; output circuits individual to the anode and cathode of each triode assembly, certain of said tubes constituting bi-stable trigger circuits and others of said tubes acting as step-by-step advancing circuits; and transfer circuits associated with the outputs of the said electron tubes, said transfer circuits each including pentode electron tubes having a cathode, an anode, a control grid, a suppressor grid and a screen grid, connections from the individual screen grids of said pentode tubes to the individual output circuits of the said triode tubes, and a common output circuit for said transfer circuits, and in which transfer impulses are applied to the suppressor grids of the said pentode tubes, said impulses being applied in phase with auxiliary impulses applied to the control grids of the said pentode tubes.

References Cited in the file of this patent

UNITED STATES PATENTS

| | | |
|---|---|---|
| 2,429,228 | Herbst | Oct. 21, 1947 |
| 2,556,200 | Lesti | June 12, 1951 |
| 2,577,141 | Mauchly et al. | Dec. 4, 1951 |
| 2,585,630 | Crosman | Feb. 12, 1952 |
| 2,591,931 | Grosdoff | Apr. 8, 1952 |
| 2,634,052 | Bloch | Apr. 7, 1953 |
| 2,700,503 | Crosman | Jan. 25, 1955 |
| 2,792,987 | Stibitz | May 21, 1957 |

OTHER REFERENCES

"The binary quantizer," by K. H. Barney, Electrical Engineering, November 1949, pages 962–967, inclusive.

"How an electronic brain works," by E. C. Berkeley et al., Radio Electronics, July 1951, pages 56, 58 and 63–65.

"Standards of electronic computers: definition of terms," 1950, Proceedings of the I. R. E.; 50 I. R. E. 8.51, pages 271–277.